United States Patent
Kobayashi (10) Patent No.: US 7,395,268 B2
(45) Date of Patent: Jul. 1, 2008

(54) ADDRESS LINK SYSTEM, METHOD AND PROGRAM PRODUCT

(75) Inventor: Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 435 days.

(21) Appl. No.: 10/873,502

(22) Filed: Jun. 23, 2004

(65) Prior Publication Data

US 2004/0267792 A1 Dec. 30, 2004

(30) Foreign Application Priority Data

Jun. 24, 2003 (JP) ............................. 2003-179325

(51) Int. Cl.
*G06F 7/00* (2006.01)
(52) U.S. Cl. ............................. 707/100; 707/3; 707/6; 707/103 Y; 707/200
(58) Field of Classification Search ................. 707/100, 707/103
See application file for complete search history.

(56) References Cited

U.S. PATENT DOCUMENTS

| | | | |
|---|---|---|---|
| 6,272,649 B1* | 8/2001 | Hayward et al. ................ 714/6 |
| 6,393,434 B1* | 5/2002 | Huang et al. ................ 707/200 |
| 2001/0048026 A1* | 12/2001 | Nishigaya et al. ............ 235/382 |
| 2002/0044149 A1* | 4/2002 | McCarthy et al. ............ 345/581 |
| 2002/0091697 A1* | 7/2002 | Huang et al. .................. 707/10 |
| 2002/0138389 A1* | 9/2002 | Martone et al. ................ 705/36 |
| 2003/0025731 A1* | 2/2003 | Chastain et al. ............. 345/764 |
| 2003/0065649 A1* | 4/2003 | Lucas et al. ..................... 707/3 |
| 2003/0167286 A1* | 9/2003 | Yasuta ........................ 707/201 |
| 2004/0083101 A1* | 4/2004 | Brown et al. ................. 704/235 |
| 2004/0117358 A1* | 6/2004 | von Kaenel et al. ............ 707/3 |
| 2004/0133571 A1* | 7/2004 | Horne et al. .................... 707/3 |
| 2004/0230564 A1* | 11/2004 | Simon et al. .................... 707/2 |
| 2005/0015432 A1* | 1/2005 | Cohen ........................ 709/201 |
| 2005/0050001 A1* | 3/2005 | Lucas et al. ..................... 707/1 |
| 2005/0281237 A1* | 12/2005 | Heinonen et al. ........... 370/338 |

FOREIGN PATENT DOCUMENTS

| | | |
|---|---|---|
| JP | 2001-177540 | 6/2001 |
| JP | 2001-249882 | 9/2001 |

\* cited by examiner

*Primary Examiner*—Wilson Lee
*Assistant Examiner*—Binh V Ho
(74) *Attorney, Agent, or Firm*—Whitham Curtis Christofferson & Cook, P.C.

(57) ABSTRACT

The address linker of an LDAP client has a capability of requesting retrieval of data in local files or retrieval of data in files registered on an LDAP server. The address linker of the LDAP server serves to share personal data and has a capability of retrieving data in files on the server and a capability of responding to data retrieval and registration request from the LDAP client. The LDAP client or server outputs a list of retrieval results and highlights latest data according to the updating date and time determined when pieces of personal data of the same name are registered in a plurality of files. The LDAP client or server further select latest data, reconstruct the data into a single file having a tree data structure and saves the file.

16 Claims, 9 Drawing Sheets

FIG.2

(CONFIGURATION OF ADDRESS LINKER PROGRAM ON LOCAL PC)

FIG.3

| FIRST NAME | LAST NAME | | MAIL | TELEPHONE | MOBILE PHONE | COMPANY NAME | ADDRESS | | FILE NAME |
|---|---|---|---|---|---|---|---|---|---|
| aaa | bbb | ○ | aaa@eiou.test | | | | | | MAIL BOOK1 |
| aaa | bbb | | aaa@eiou.test1 | | | | | | MAIL BOOK2 PHONE BOOK |
| aaa | bbb | | | | | | | | PERSONAL PHONE BOOK |
| aaa | bbb | | | 1234-56789 | ○ | NEC Infrontia | 1-19-9 TSUTSUMI STREET | ○ | OCR NAME CARD |
| aaa | bbb | | | | 9876-543210 | | | | SOFTWARE |
| ccc | bbb | | ccc@abcd.test | | | | | | MAIL BOOK1 |
| ccc | bbb | | | 1234-55667 | | | | | PHONE BOOK1 |
| ccc | bbb | | | 1234-55667 | | | | | PHONE BOOK2 |
| ccc | bbb | | | | 9988-543210 | NEC Infrontia | HEAD OFFICE AT KANNDA | | PERSONAL PHONE BOOK |
| ccc | bbb | | | | | | | | OCR NAME CARD |

SAVE-TO-PC BUTTON    SAVE-TO-SERVER BUTTON

⇨ SAVE CHECKED INFORMATION ON LOCAL PC OR SERVER

| FIRST NAME | LAST NAME | MAIL | TELEPHONE | MOBILE PHONE | COMPANY NAME | ADDRESS |
|---|---|---|---|---|---|---|
| aaa | bbb | aaa@eiou.test1 | 1234-56789 | 9876-543210 | NEC Infrontia | 1-19-9 TSUTSUMI ST. |

(LIST OF RETRIEVAL RESULTS ON LOCAL PC)

FIG.6

| FIRST NAME | LAST NAME | | MAIL | TELEPHONE | MOBILE PHONE | COMPANY NAME | ADDRESS | FILE NAME |
|---|---|---|---|---|---|---|---|---|
| abc | def | O | abc@eiou.test | 1111-22334 | | | | MAIL BOOK1 |
| abc | def | | | | | | | PERSONAL PHONE BOOK |
| abc | def | | | | O | | | PERSONAL PHONE BOOK |
| abc | def | | | | 9999-87654 | NEC Infrontia | 2-6-1 KITAMIKATA | OCR NAME CARD SOFTWARE |
| abc | def | | | | 9099-87654 | | | PERSONAL PHONE BOOK2 |
| ggg | def | | ggg@aaei.test | | | | | MAIL BOOK1 |
| ggg | def | | | 4433-22110 | | | | PHONE BOOK1 |
| ggg | def | | | 4433-22110 | | | | PHONE BOOK2 |
| ggg | def | | | | 9900-122334 | NEC Infrontia | HEAD OFFICE AT KANNDA | PERSONAL PHONE BOOK |
| ggg | def | | | | | | O | OCR NAME CARD SOFTWARE |

SAVE BUTTON

SAVE CHECKED INFORMATION ON SERVER

| FIRST NAME | LAST NAME | MAIL | TELEPHONE | MOBILE PHONE | COMPANY NAME | ADDRESS |
|---|---|---|---|---|---|---|
| abc | def | abc@eiou.test | 1111-22334 | 9999-87654 | NEC Infrontia | 2-6-1 KITAMIKATA |

(LIST OF RETRIEVAL RESULTS ON SERVER)

FIG.7

(FLOW OF ADDRESS LINKER ON LOCAL PC)

FIG.8

| LDAP CLIENT | | | | ✕ |
|---|---|---|---|---|
| RETRIEVAL PLACE | ADDRESS LINKER ▼ | | SERVER SETTING | |
| RETRIEVAL CONDITION | ○ or   ⊙ and | | | |
| LAST NAME | INFRONTIER | | | |
| FIRST NAME | TARO | | RETRIEVE | |
| COMPANY NAME | | | | |
| SECTION NAME | | | | |
| E-MAIL | | | | |

| NAME | COMPANY | SECTION | E-MAIL |
|---|---|---|---|
| | | | |
| | | | |
| | | | |
| | | | |
| | | | |
| | | | |
| | | | |

SEND | REGISTER IN PHONE BOOK | CLOSE

FIG.9

(FLOW OF ADDRESS LINKER ON SERVER)

ADDRESS LINK SYSTEM, METHOD AND PROGRAM PRODUCT

BACKGROUND OF THE INVENTION

1. Field of the Invention

The present invention relates to an address link system which searches the addresses of data files held by a client (local PC) or a server and reconstructs registered data.

2. Description of the Related Art

When personal data, such as a phone book and addresses, are managed on a PC (Personal Computer), conventionally, the personal data is saved in different files like spreadsheet software, database software, scheduler software, greeting card software, OCR scan software, addressing software and a mailer according to the purposes.

For example, Japanese Patent Publication No. 2001-177540 A discloses a local address book synchronizing system which automatically synchronizes and updates an address book in a digital transmitter connected to a network.

As pieces of data of the same person are dispersed at different locations, however, retrieval of personal data is troublesome and takes time. Individual softwares save data in different file formats most of which are not compatible. This makes it difficult to organize those pieces of data into a single file while the individual softwares are being used.

When the address and telephone number are changed for the same person due to moving or so, new data may be present in a file of one software while old data may be present in a file of another software. This makes it difficult to determine which data is new.

Further, when a plurality of persons share the file at a server, particularly, persons other than one user often update data, making data retrieval harder.

SUMMARY OF THE INVENTION

Accordingly, it is an object of the invention to provide an address link system, method and program product which retrieve pieces of data registered in data files held at a client or a server and reconstruct the pieces of data into a single file having a tree data structure.

To solve the above-described problem, the present invention is directed to an address link system including a client terminal which has a plurality of data files, wherein the client terminal comprises: means for retrieving personal data registered in the data files by address searching in the data files; means for determining whether the retrieved personal data is new or old; and means for selecting new data based on the determination result and highlighting the new data on a screen or means for selecting new data from those pieces of data which are subjected to new/old determination, reconstructing the new data into a single file having a tree data structure and registering the reconstructed new data.

The present invention further includes a server connected to the client terminal over a network and having a plurality of data files, wherein the server comprises: means for retrieving personal data registered in the data files by address searching in the data files of the server in response to a request from the client terminal; means for determining whether the retrieved personal data is new or old; and means for transmitting retrieval result data for highlighting new data based on the determination result or means for selecting new data from those pieces of data which are subjected to new/old determination, reconstructing the new data into a single file having a tree data structure, and transmitting the personal data whose retrieval is requested as a single piece of data composed of only the latest data.

With the foregoing structure, pieces of personal data registered in a plurality of files at a client or a server can be retrieved and displayed as data of a single file, or reconstructed into a single file having a tree data structure.

DETAILED DESCRIPTION OF THE PREFERRED EMBODIMENT

A preferred embodiment of the invention will be described below with reference to the accompanying drawings.

Figure 1:
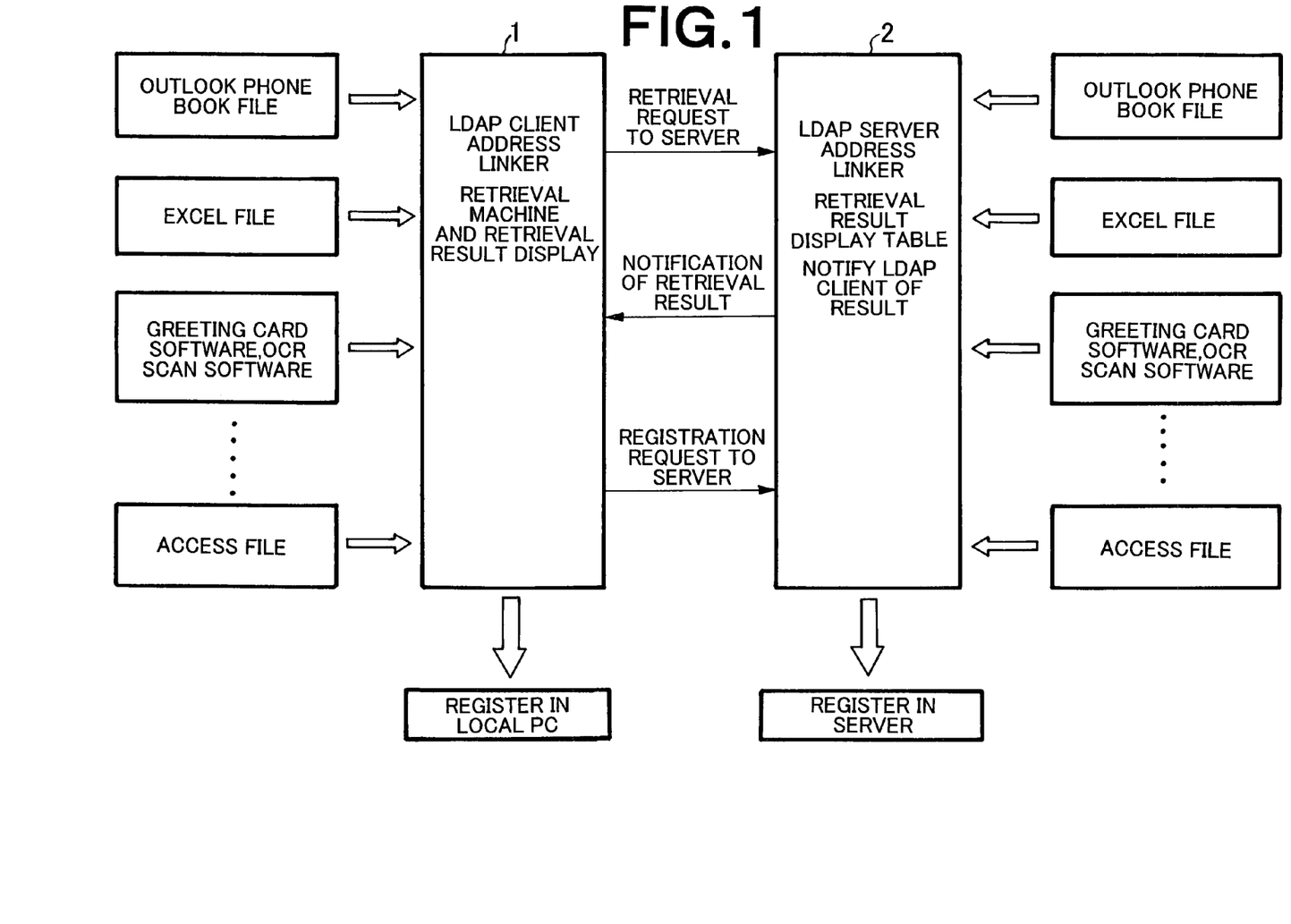
FIG. 1 is a diagram showing the relationship between address linkers on a client and a server according to the invention.

FIG. 1 shows the relationship between address linkers (programs) on a client terminal (local PC) and a server according to the invention. The two address linkers exchange data with each other over a network. In the embodiment, LDAP (Lightweight Directory Access Protocol) is used as a protocol for address searching. The use of LDAP can permit a client and a server to share files and access the directory over an IP (Internet Protocol) network.

An address linker 1 of the LDAP client (local address linker) has a capability of retrieving data in a plurality of local files, such as an Excel file, Outlook Phone Book file, greeting card software, OCR scan software and the like or retrieving data in a plurality of files, registered on the LDAP server.

An address linker 2 of the LDAP server shares personal data. Like the local address linker, the address linker 2 has a capability of retrieving data in a plurality of files on the LDAP server, such as an Excel file, Outlook Phone Book file, greeting card software, OCR scan software and the like and a capability of responding to data retrieval and registration request from the LDAP client.

One retrieval method is to retrieve data saved in local files of the LDAP client, and the other one is to retrieve data in files registered in the LDAP server.

Figure 2:
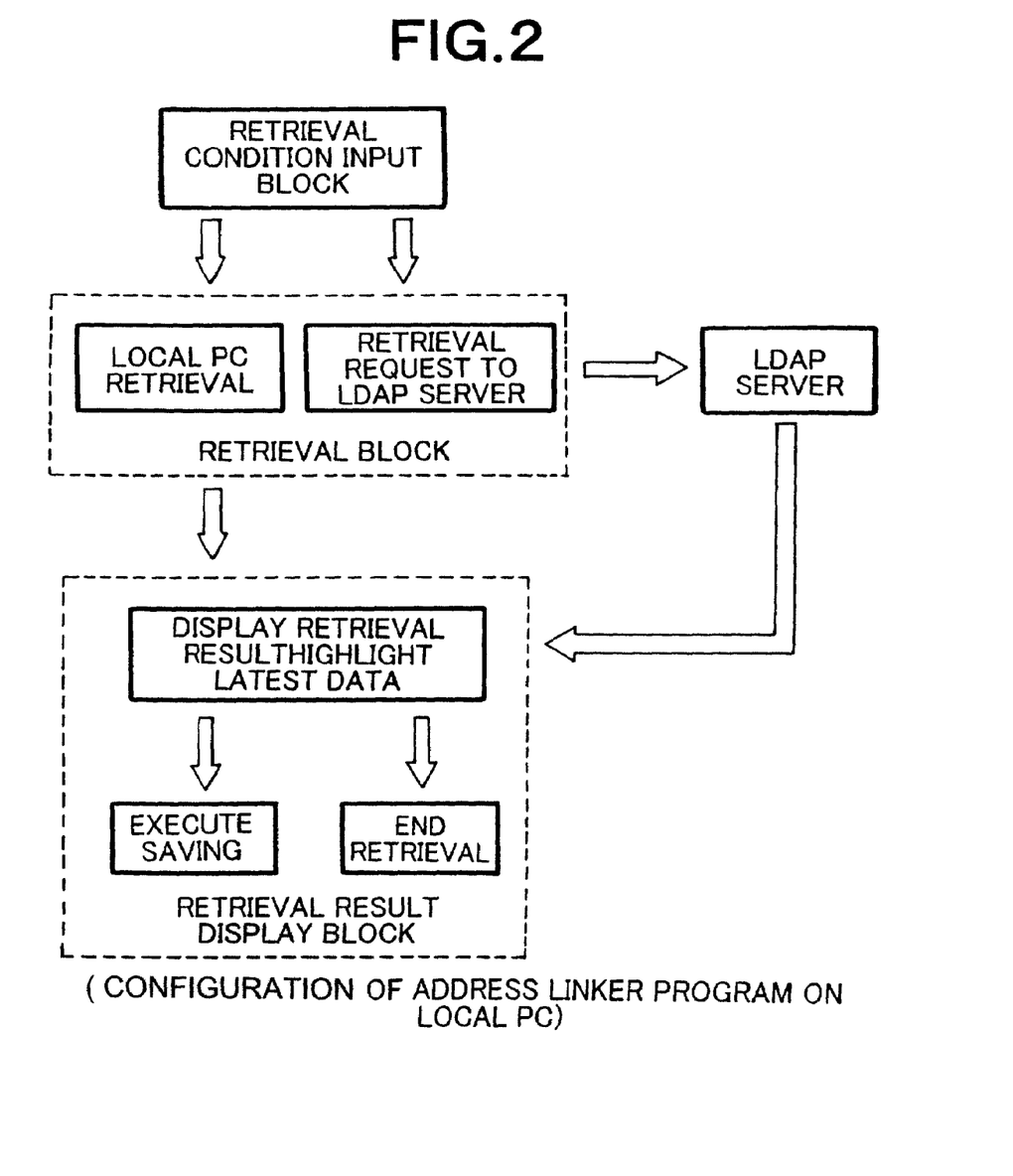
FIG. 2 is a structural diagram of an address linker program on a local PC.

Referring to FIG. 2, the address linker program on the local PC of the invention comprises three blocks. A retrieval condition input block inputs a retrieval condition, a retrieval item and a retrieval method. A retrieval block is composed of retrieval in the local PC and a retrieval request to the LDAP server. A retrieval result display block performs data retrieval result display and displays the retrieval results, highlights latest data, and displays a save program execution button or a retrieval program end button.

Figure 3:
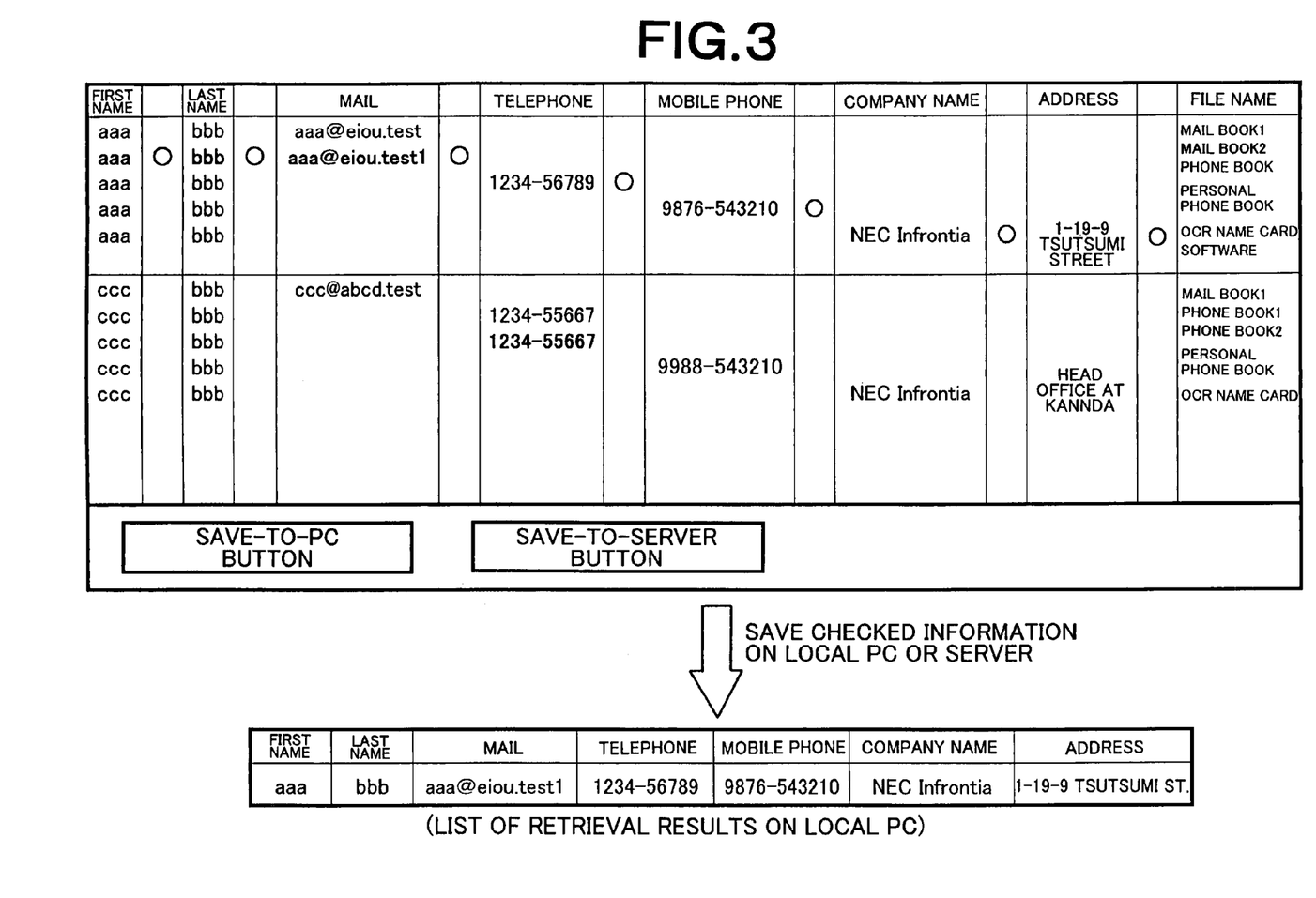
FIG. 3 is a diagram showing a list of retrieval results on the local PC.

The output is a list of retrieval results as shown in FIG. 3. When retrieval data has plural entries, i.e., personal data of the same name is registered in a plurality of files, latest data is highlighted. The "highlighting" is to show data of interest outstanding from a portion around it by changing the display luminance, inverting the white and black areas, coloring the data area to a different color, or some other means. Further, the latest data marked with a circle in the list of retrieval results in the upper portion of in FIG. 3 can be selected and reconstructed into a data file of a list in the lower portion to be saved there.

Figure 4:
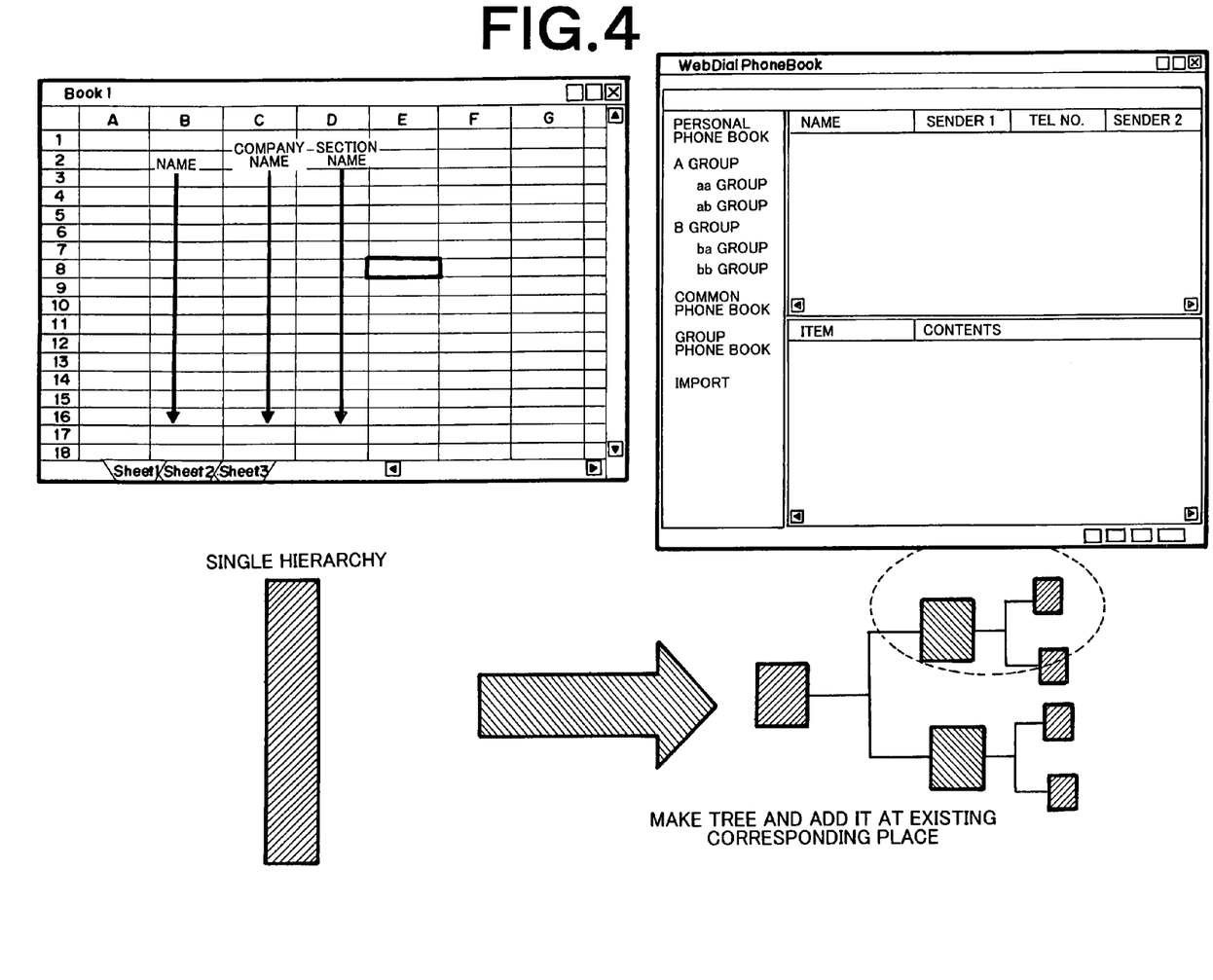
FIG. 4 is a diagram showing the data structure of a file.

FIG. 4 shows the data structure of the file. File data with a single hierarchy structure selected from the list on the left-hand side in the diagram is reconstructed into a single file (Web Dial Phone Book) with a tree data structure having a hierarchical structure for each group as shown on the right-hand side in the diagram. Specifically, pieces of data corresponding to individual names are registered in a single hierarchy in the alphabetical order in the list on the left-hand side, whereas an aa group and an ab group belong to an A group and pieces of data corresponding to individual names are reconstructed to those groups and registered in the list shown on the right-hand side. The LDAP adapted application software (mailer or so) of the LDAP client can access data in the reconstructed file.

Figure 5:
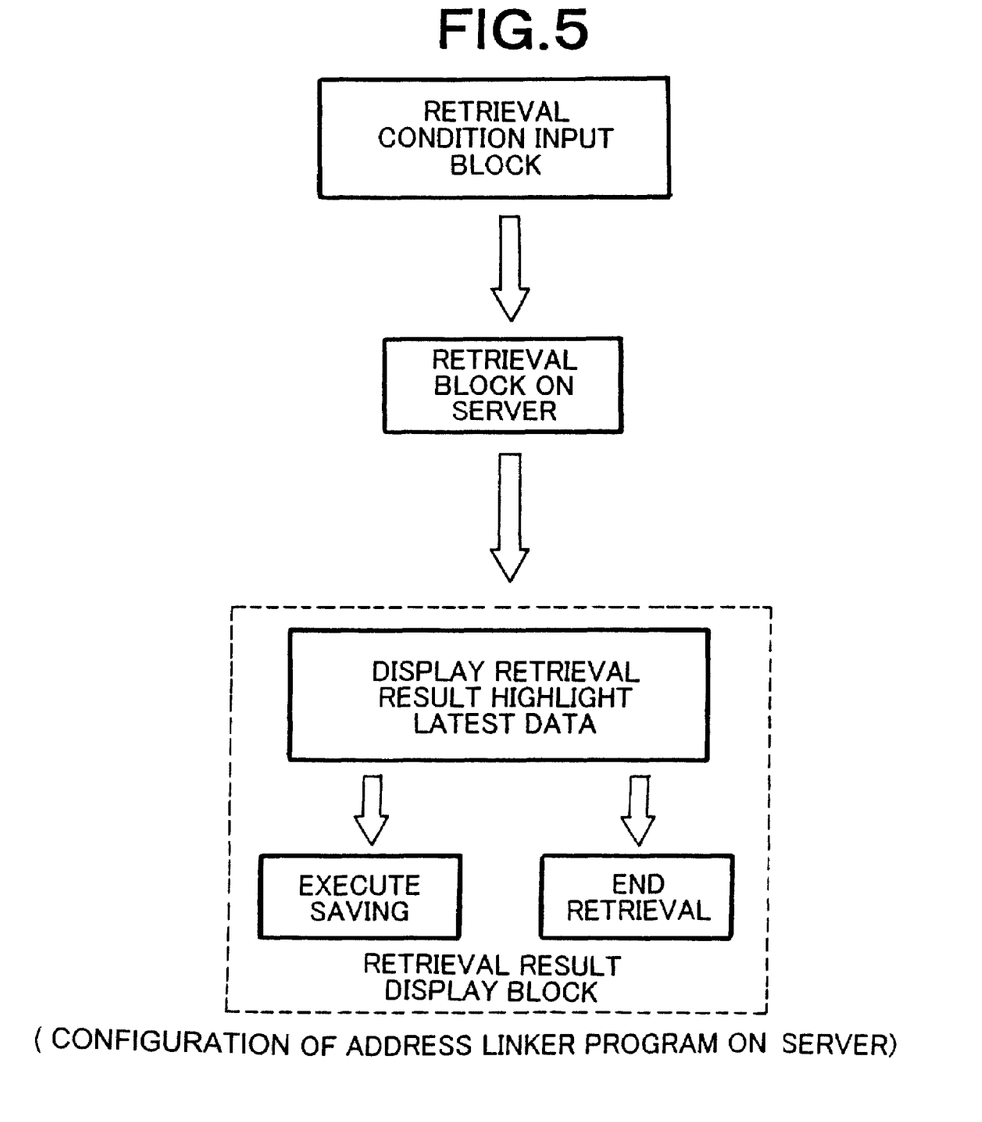
FIG. 5 is a structural diagram of an address linker program on the server.

Referring to FIG. 5, the address linker program on the server of the invention comprises three blocks. A retrieval condition input block inputs a retrieval condition and a retrieval item. A retrieval block performs retrieval on the server. A retrieval result display block performs data retrieval result display and displays the retrieval results, highlights latest data, and displays a save program execution button or a retrieval program end button.

Figure 6:
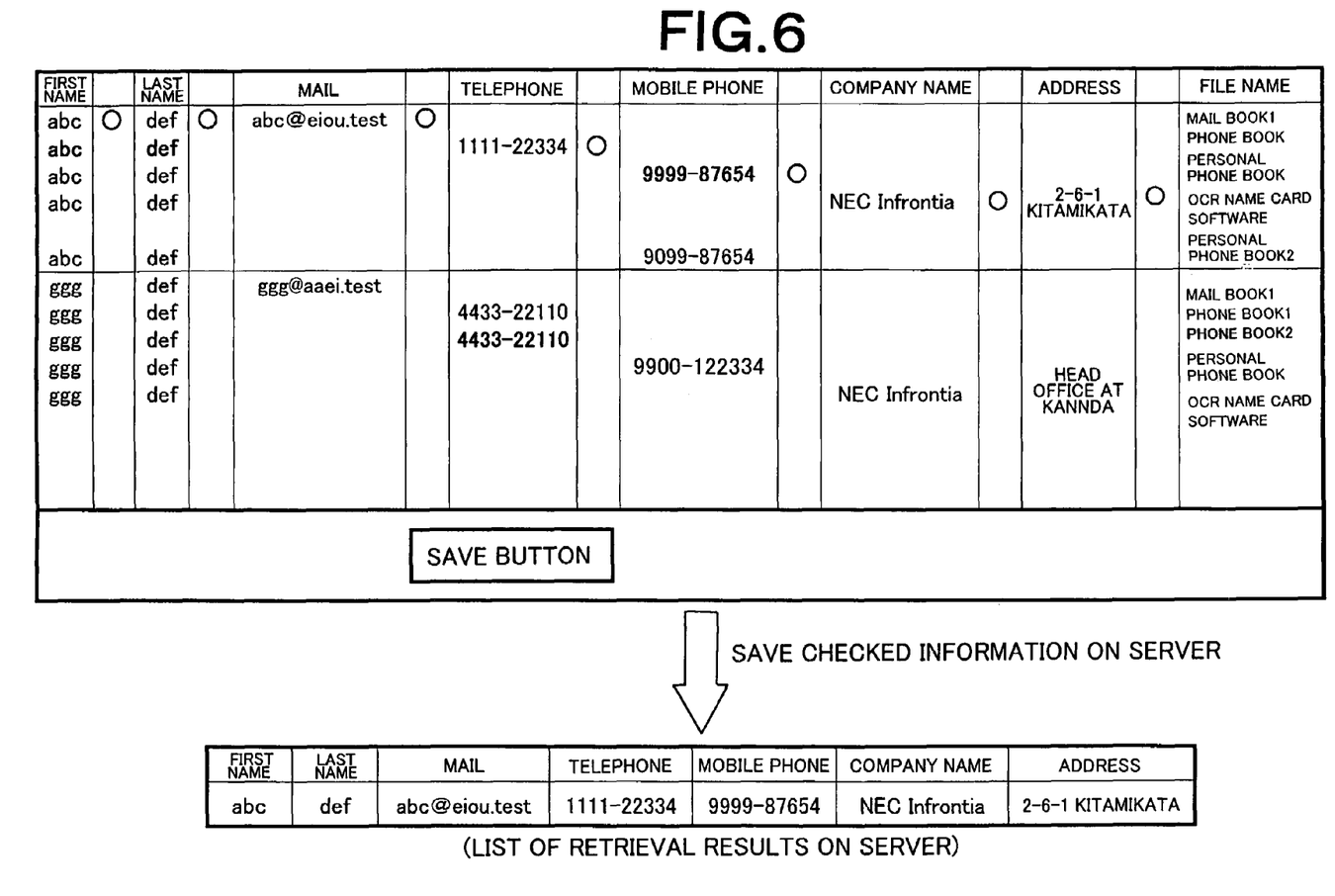
FIG. 6 is a diagram showing a list of retrieval results on the server.

The output is notified to the LDAP client as a list of retrieval results on the server as shown in FIG. 6. When retrieval data has plural entries, latest data is highlighted. Further, the address linker program has a capability of selecting the latest data marked with a circle in the list of retrieval results in the upper portion of FIG. 6, and reconstructing the data into a single file having a tree data structure as shown in a list in the lower portion and saving the file.

In this manner, personal data saved in a different file is retrieved, it is determined from the updating date and time whether the data is new or old, one latest data is displayed and is saved in a file having a tree data structure based on the determination result. Further, the LDAP server/client function can permit reference to latest data of other persons'.

Figure 7:
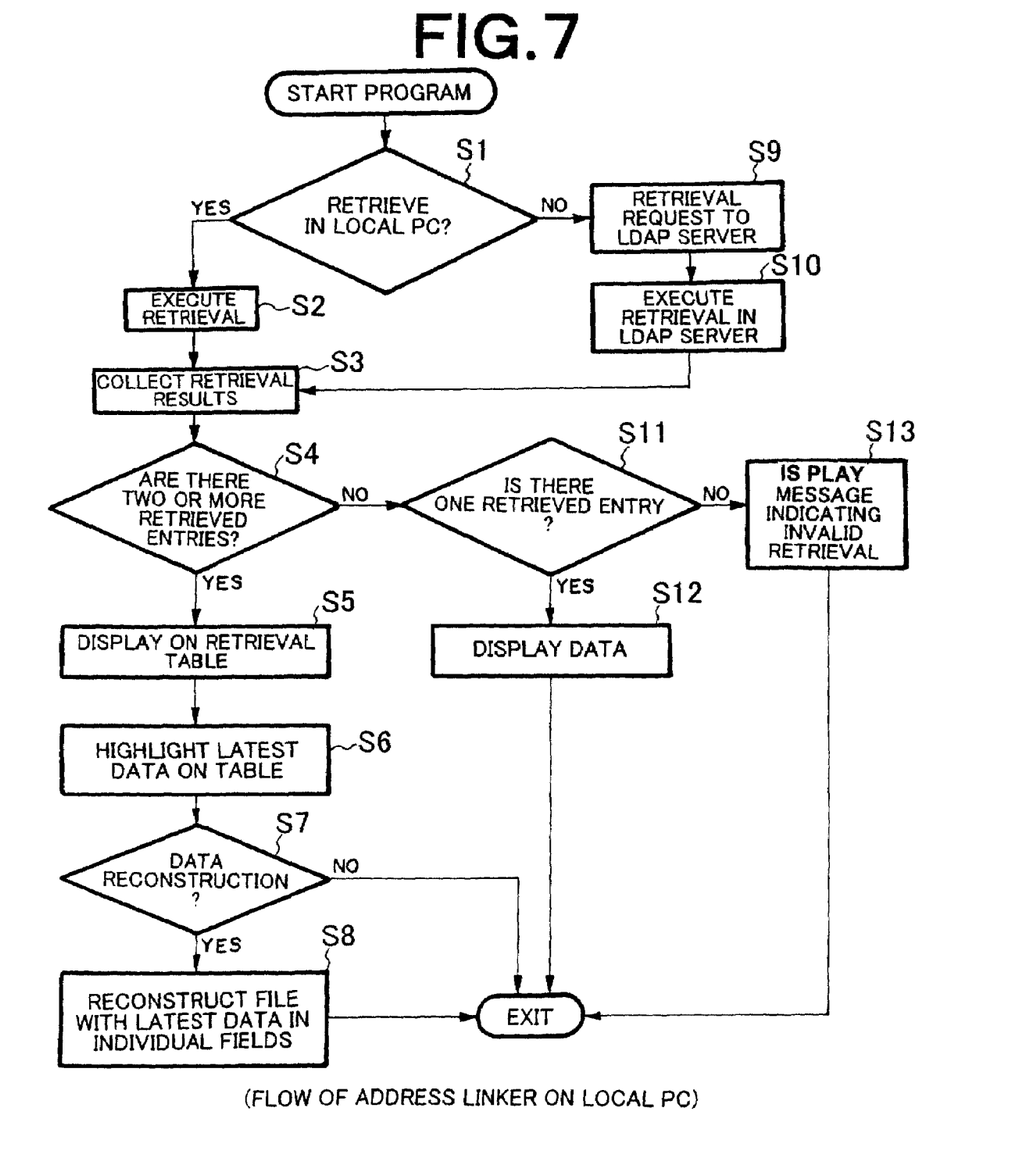
FIG. 7 is a flowchart of the operation of the address linker program on the local PC.

The operation of the address linker on the local PC is described referring to a flowchart illustrated in FIG. 7.

Figure 8:
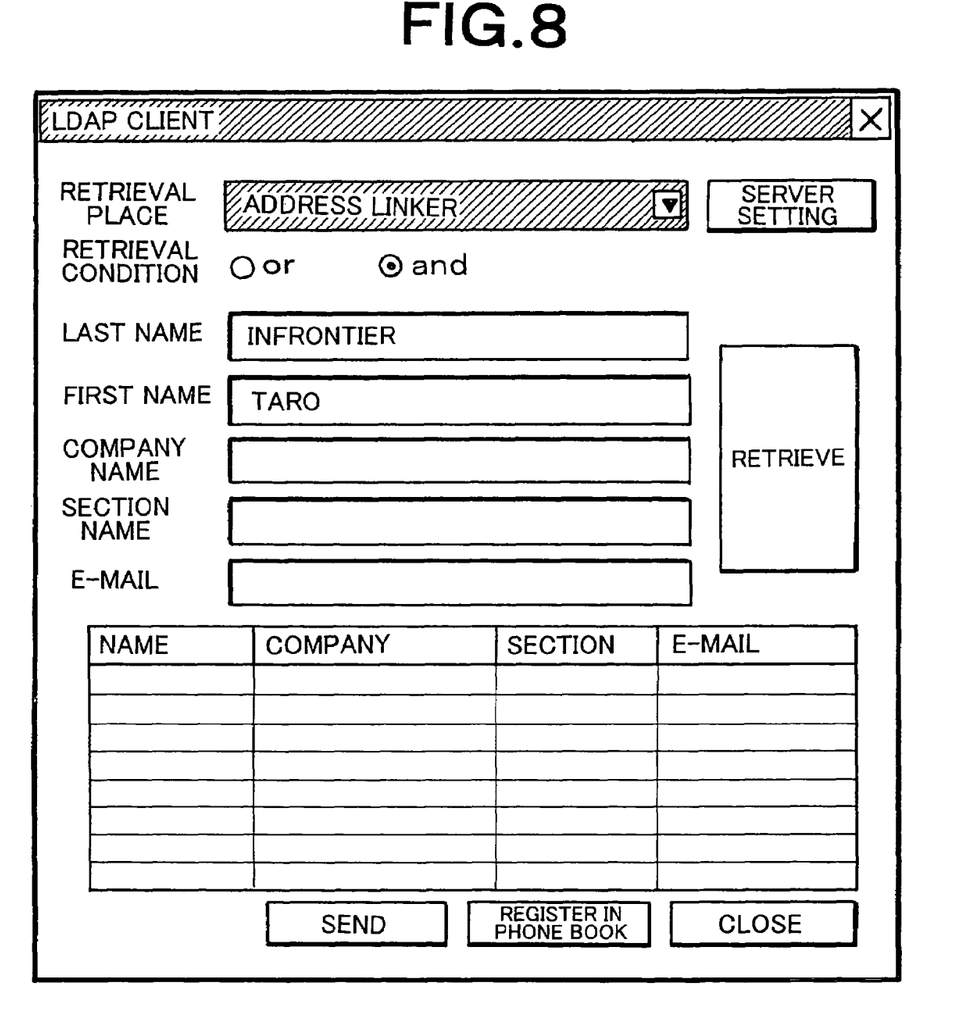
FIG. 8 is a diagram showing an input screen.

As the program is run, an input screen as shown in FIG. 8 is displayed, where a user designates retrieval items and retrieval conditions. Items, such as a first name, a last name, a mail address, a telephone number, a mobile phone number, a company name, and an address in the retrieval list in FIG. 3, are designated as the retrieval items.

To designate the retrieval place, the location of a data file registered on the local PC or a data file registered in the server is selected (S1). When the location of a data file registered on the local PC is designated, file retrieval on the local PC is executed (S2). When a data file registered in the server is designated, a retrieval request is sent to the LDAP server (S9), a retrieval is performed in the LDAP server (S10), and the retrieval result is notified to the LDAP client (local PC). The address linker on the server has a capability of retrieving a data file on the server.

The local PC collects the retrieval results and executes the retrieval result display block in FIG. 2 (S3). When the retrieval results indicate the presence of two or more retrieved entries (S4), a list of retrieval results is displayed (S5). Then, latest data on the table is highlighted according to the result of the determination of the updating date and time of the file (S6). When the user optionally reconstructs the retrieval results and save it (S7), a single file having a tree data structure is reconstructed with the latest data in the individual files as shown in FIG. 3 and is saved (S8). Depending on whether the state is after saving or no saving, the program is finished at the end of retrieval.

When there are not two or more retrieved entries at step 4, it is determined whether there is one retrieved entry or not (S11). When there is one retrieved entry, the data is displayed (S12). When there is no retrieved entry, a message indicating invalid retrieval is displayed (S13).

Figure 9:
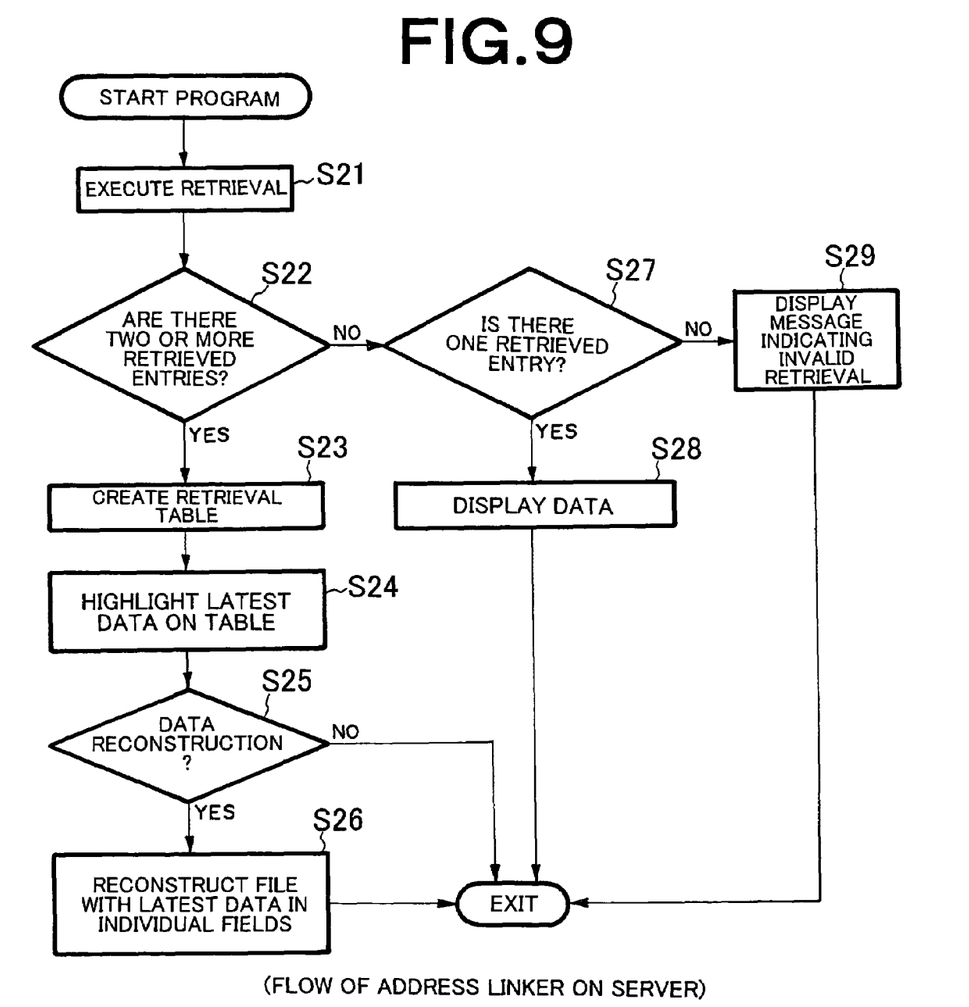
FIG. 9 is a flowchart the operation of the address linker program on the server.

Next, the operation of the address linker on the server will be discussed referring to a flowchart illustrated in FIG. 9. The address linker on the server has a capability of retrieving data in a plurality of files registered beforehand in the LDAP server, in response to a request from the LDAP client, and notifies the retrieval result to the LDAP client.

As the program on the local PC is run, an input screen is displayed, so that a user selects the location of a data file registered on the server. Items, such as a first name, a last name, a mail address, a telephone number, a mobile phone number, a company name, and an address in the retrieval list in FIG. 6, are designated as the retrieval items and are transmitted to the server.

Upon reception of the retrieval items, the address linker on the server executes retrieval of a file on the server (S21). When the retrieval results show the presence of two or more retrieved entries (S22), a list of retrieval results is displayed (S23). Then, data for highlighting the latest data on the table is generated according to the result of the determination of the updating date and time of the file (S24). When the user optionally reconstructs the retrieval results and save it (S25), a single file having a tree data structure is reconstructed with the latest data in the individual files as shown in FIG. 6 and is saved, and personal data whose retrieval is requested is sent to the local PC as single data composed of only the latest data (S26). Depending on whether the state is after saving or no saving, the program is finished at the end of retrieval.

When there are not two or more retrieved entries at step 22, it is determined whether there is one retrieved entry or not (S27). When there is one retrieved entry, data for displaying that data is transmitted to the local PC (S28). When there is no retrieved entry, data for displaying a message indicating invalid retrieval is transmitted to the local PC (S29).

As described above, the first effect of the invention is such that the address linker program can retrieve personal data registered in a plurality of files on a local PC and display the personal data as data of a single file. Because the data can be reconstructed and save in a single file having a tree data structure, processing of personal data after being saved becomes simple.

The second effect of the invention lies in that when personal data of the same name is registered in a plurality of files, latest data is highlighted, thereby shortening the database maintenance time.

Further, as the LDAP client can construct personal data in the LDAP server, the personal data can be shared so that data of other persons than the user can be referred to.

What is claimed is:

1. An address link system including a client terminal having a plurality of data files created by different software and having a plurality of personal data items, each item having an item name, a value, and an update date, wherein said client terminal comprises means for registering the personal data items according to an address linker protocol to be address searchable and retrievable from the data files based on a search request name; means for retrieving said personal data items registered in said data files by address searching said client data files based on a user-input search request name and the address linker protocol, and outputting a retrieval result having personal data items associated with the user-input search request name; means for determining, in response to the retrieval result having more than one personal data item having the same item name, which of said retrieved personal data items is new or old, based on said items' respective update dates; means for selecting new data based on a result of the determining and highlighting said new data on a screen; and means for reconstructing said new data into a single file having a tree data structure and registering the reconstructed single file of new data, wherein the address linker protocol is LDAP (Lightweight Directory Access Protocol).

2. The address link system according to claim 1, further including a server connected to said client terminal over a network and having a plurality of server data files created by different software, said data files having a plurality of personal data items, each item having an item name, a value, and an update date, wherein said server comprises:

means for registering said personal data items according to an address linker protocol to be address searchable and retrievable from the server data files based on a search request name;

means for retrieving said personal data items registered in said server data files by address searching said server data files in response to a request from said client terminal having the user-input search request name, and outputting a server retrieval result having the personal data items in the server data files associated with the user-input search request name;

means for determining, in response to the retrieval result having more than one personal data item having the same item name, which of said retrieved personal data items is new or old, based on said items' respective update dates; and means for transmitting the server retrieval result data for highlighting new data based on the determination result.

3. The address link system according to claim 1, further including a server connected to said client terminal over a network and having a plurality of server data files created by different software, said data files having a plurality of personal data items, each item having an item name, a value, and an update date, wherein said server comprises:

means for registering said personal data items according to an address linker protocol to be address searchable and retrievable from the server data files based on a search request name;

means for retrieving said personal data items registered in said server data files by address searching said server data files in response to a request from said client terminal, the request having the user-input search request name, and outputting a server retrieval result having the personal data items in the server data files associated with the user-input search request name;

means for determining, in response to the retrieval result having more than one personal data item having the same item name, which of said retrieved personal data items is new or old, based on said items' respective update dates; and means for selecting new data from pieces of data which are determined as new/old by said means for determining, and for reconstructing said selected new data into a single file having a tree data structure, and transmitting the personal data retrieved by the server to the client as a single piece of data composed of only the selected new data.

4. The address link system according to claim 2, wherein said client means for retrieving and said server means for retrieving each perform the address searching based on a LDAP protocol.

5. The address link system according to claim 3, wherein said client means for retrieving and said server means for retrieving each perform the address searching based on a LDAP protocol.

6. An address link method for a client terminal having a plurality of data files created by different software and having a plurality of personal data items, each item having an item name, a value, and an update date: registering said personal data items according to an address linker protocol to be address searchable and retrievable from the server data files based on a search request name; receiving a user-input search request name; retrieving personal data registered in said data files by address searching said data files and generating a retrieval result of items associated with the user-input search request name; determining, in response to the retrieval result having more than one personal data item having the same item name, which of said retrieved personal data items is new or old, based on said items' respective update dates; selecting new data based on a result of the determining and highlighting said new data on a screen; and reconstructing said new personal data into a single file having a tree data structure and registering the reconstructed new data, wherein the address linker protocol is LDAP (Lightweight Directory Access Protocol).

7. The address link method according to claim 6, further comprising:

providing a server connected to said client terminal over a network and having a plurality of server data files created by different software, the server data files having a plurality of personal data items, each item having an item name, a value, and an update date;

registering said personal data items according to an address linker protocol to be address searchable and retrievable from the server data files based on a search request name;

retrieving said personal data items registered in said server data files by address searching said server data files in response to a request from said client terminal, the request having the user-input search request name, and outputting a server retrieval result having the personal data items in the server data files associated with the user-input search request name;

determining, in response to the server retrieval result having more than one personal data item having the same item name, which of said retrieved personal data items is new or old, based on said items' respective undate dates; and transmitting the server retrieval result data to the client for highlighting new data based on the determination result.

8. The address link method according to claim 6, further comprising:

providing a server connected to said client terminal over a network and having a plurality of server files created by different software, the server data files having a plurality of personal data items, each item having an item name, a value, and an update date;

registering said personal data items according to an address linker protocol to be address searchable and retrievable from the server data files based on a search request name;

retrieving said personal data items registered in said server data files by address searching said server data files in response to a request from said client terminal, the request having the user-input search request name, and outputting a server retrieval result having the personal data items in the server data files associated with the user-input search request name;

determining, in response to the server retrieval result having more than one personal data item having the same item name, which of said retrieved personal data items is new or old, based on said items' respective update dates; and selecting new data from pieces of data which are determined as new/old by said means for determining, and for reconstructing said selected new data into a single file having a tree data structure, and transmitting the personal data retrieved by the server to the client as a single piece of data composed of only the selected new data.

9. The address link method according to claim 6, wherein said retrieving performs said address searching based on a LDAP (Lightweight Directory Access Protocol).

10. The address link method according to claim 7, wherein said retrieving performs said address searching based on a LDAP (Lightweight Directory Access Protocol).

11. A computer system comprising a programmable computer storing a plurality of data files created by different software, the data files having a plurality of personal data items, each item having an item name, a value, and an update date, and having an address linker program, wherein the address linker program registers a plurality of search names and associates each search name with a corresponding plurality of personal data items within the plurality of data files, the address linker program on the programmable computer includes a block for receiving a user input search request having a search name, the address linker program on the programmable computer includes a block for retrieving personal data registered in said data files by address searching said data files and generating a retrieval result of items associated with the user-input search name, the address linker program on the programmable computer includes a block for determining, in response to the retrieval result having a plurality personal data items having the same item name, which of the plurality of said retrieved personal data items is new or old with respect to other of the plurality, based on said items' respective update dates, the address linker program on the programmable computer including a block for selecting new data based on a result of the determining and highlighting said new data on a screen; and the address linker program on the programmable computer including a block for reconstructing said new personal data into a single file having a tree data structure and registering the reconstructed new date, wherein the address linker protocol is LDAP (Lightweight Directory Access Protocol.

12. A computer system having a programmable server connected to a client terminal over a network and comprising a plurality of data files on the programmable server, created by different software, the data files having a plurality of personal data items, each item having an item name, a value, and an update date, and having an address linker program; an address linker program on the programmable server, wherein the address linker program registers a plurality of search names and associates each search name with a corresponding plurality of personal data items within the plurality of data files, the address linker program on the programmable server includes a block for receiving a user input search request having a search name, the address linker program on the programmable server includes a block for retrieving personal data registered in said data files by address searching said data files and generating a retrieval result of items associated with the user-input search name, the address linker program on the programmable server includes a block for determining, in response to the retrieval result having a plurality personal data items having the same item name, which of the plurality of said retrieved personal data items is new or old with respect to other of the plurality, based on said items' respective update dates, and the address linker program on the programmable server includes a block for selecting new data from pieces of data which are determined as new/old by said means for determining, and for reconstructing said selected new data into a single file having a tree data structure, and transmitting the personal data retrieved by the server to the client as a single piece of data composed of only the selected new data, wherein the address linker protocol is LDAP (Lightweight Directory Access Protocol).

13. A computer system according to claim 11, wherein said address link program includes LDAP protocol for the address searching.

14. A computer system according to claim 11, wherein said address link program includes LDAP protocol for the address searching.

15. An address link system including a client terminal and a server connected to said client terminal over a network, said server having a plurality of server data files created by different software, said data files having a plurality of personal data items, each item having an item name, a value, and an update date, wherein said server comprises means for registering said personal data items according to an address linker protocol to be address searchable and retrievable from the server data files based on a search request name; means for retrieving said personal data items according to an address linker protocol to be address searchable and retrievable from the server data files based on a search request name; means for retrieving said personal data items registered in said server data files by address searching said sever data files in response to a request from said client terminal having the user-input search request name, and outputting a server retrieval result having the personal data items in the server data files associated with the user-input search request name; means for determining, in response to the retrieval result having more than one personal data item having the same item name, which of said retrieved personal data items is new or old, based on said item's respective update dates; means for selecting new data based on a result of the determining and highlighting said new data on a screen; and means for reconstructing said new data into a single file having a tree data structure and registering the reconstructed single file of new data, and transmitting the personal data retrieved by said server to said client terminal as a single piece of data composed of only the selected new data, wherein the address linker protocol is LDAP (Lightweight Directory Access Protocol).

16. An address link method for address link system including a client terminal and a server connected to said client terminal over a network, said server having a plurality of server data files created by different software, said data files having a plurality of personal data items, each item having an item name, a value, and an update date, wherein the method comprises registering, by said server, said personal data items according to an address linker protocol to be address searchable and retrievable from the server data files based on a search request name; retrieving, by said server, said personal data items registered in said server data files by address searching said server data files in response to a request from said client terminal having the user-input search request name, and outputting a server retrieval result having the personal data items in the server data files associated with the user-input search request name; determining, in response to the retrieval result having more than one personal data item having the same item name, which of said retrieved personal data items is new or old, based on said item's respective update dates, by said server; selecting, by said server, new data based on a result of the determining and highlighting said new data on a screen; and reconstructing, by said server, said new data into a single file having a tree data structure and registering the reconstructed single file of new data, and transmitting the personal data retrieved by said server to said client terminal as a single piece of the data composed of only the selected new data, wherein the address linker protocol is LDAP (Lightweight Directory Access Protocol).

* * * * *